F. H. BUCKINGHAM.
SCALE.
APPLICATION FILED FEB. 18, 1909.

939,213.

Patented Nov. 9, 1909.
3 SHEETS—SHEET 1.

Witnesses
O. B. Baenziger.
E. M. Brown.

Inventor
Fremont H. Buckingham.
Edward N. Pagelsen.
Attorney

F. H. BUCKINGHAM.
SCALE.
APPLICATION FILED FEB. 18, 1909.
939,213.
Patented Nov. 9, 1909.
3 SHEETS—SHEET 2.
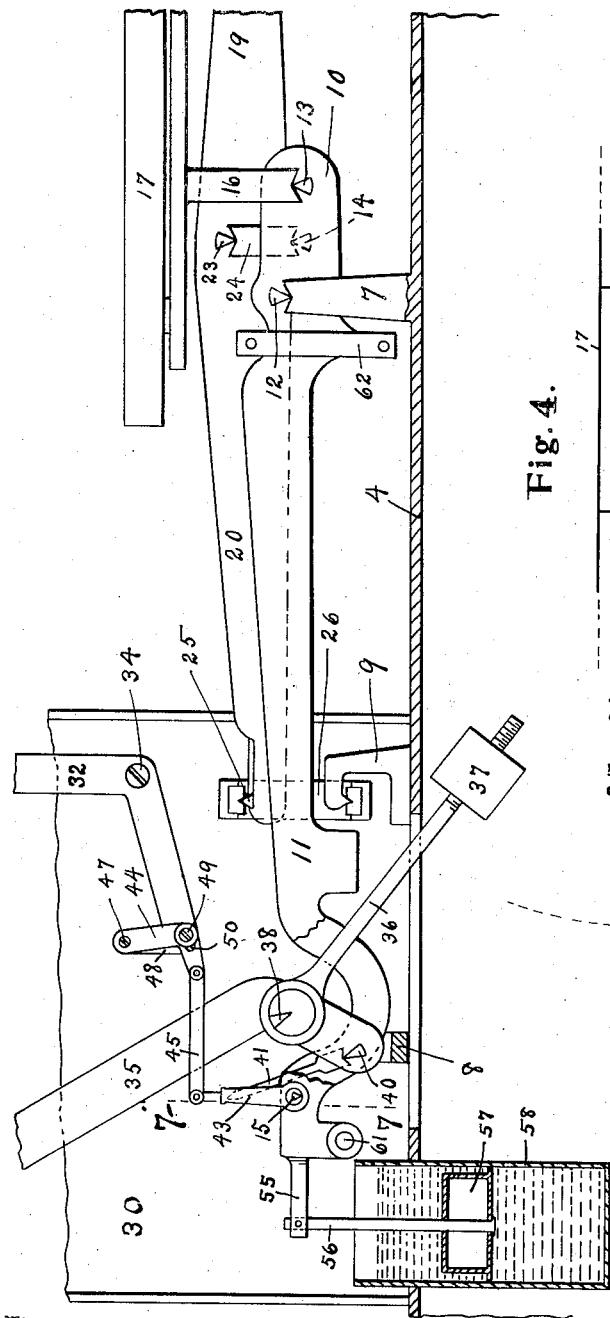
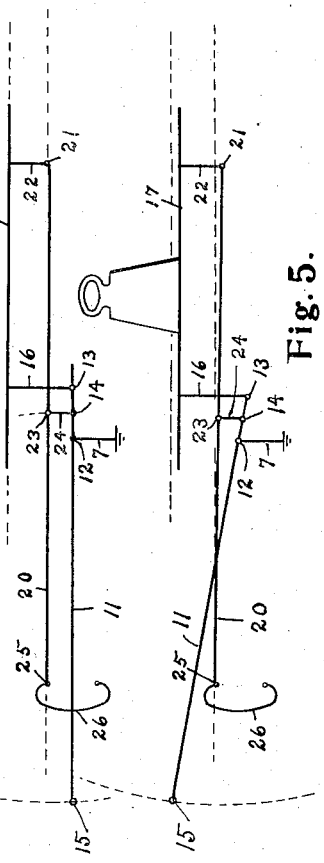
Witnesses
O. B. Baenziger
E. M. Brown
Inventor
Fremont H. Buckingham
By Edward N. Pagelsen, Attorney F. H. BUCKINGHAM.
SCALE.
APPLICATION FILED FEB. 18, 1909.
939,213.
Patented Nov. 9, 1909.
3 SHEETS—SHEET 3.
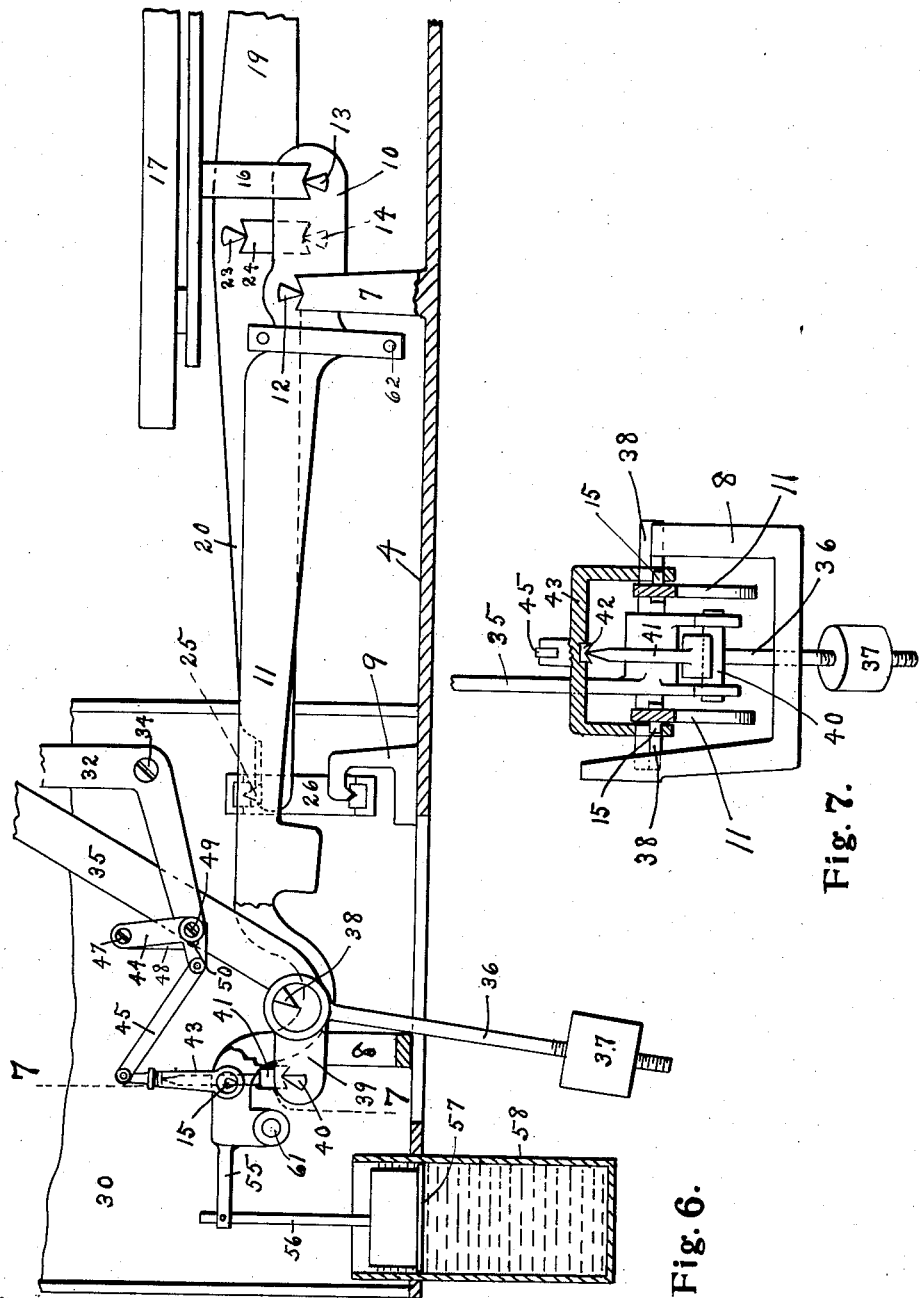

UNITED STATES PATENT OFFICE.

FREMONT H. BUCKINGHAM, OF DETROIT, MICHIGAN, ASSIGNOR TO STANDARD COMPUTING SCALE COMPANY, LIMITED, OF DETROIT, MICHIGAN, A LIMITED PARTNERSHIP.

SCALE.

939,213.   Specification of Letters Patent.   Patented Nov. 9, 1909.

Application filed February 18, 1909. Serial No. 478,682.

*To all whom it may concern:*

Be it known that I, FREMONT H. BUCKINGHAM, a citizen of the United States, and a resident of Detroit, in the county of Wayne and State of Michigan, have invented a new and Improved Scale, of which the following is a specification.

This invention relates to automatic weighing scales in which the angular position of a pendulum is varied by the downward pressure of the article being weighed, which change of position is indicated by a movable indicator, and the objects of this invention are to provide a scale of this kind wherein the indicator shall always move through equal arcs for equal increases and decreases of the weight of the articles on the scale, and wherein all parts which move relative to each other accomplish their movements from relatively fixed lines or points.

Figure 2:
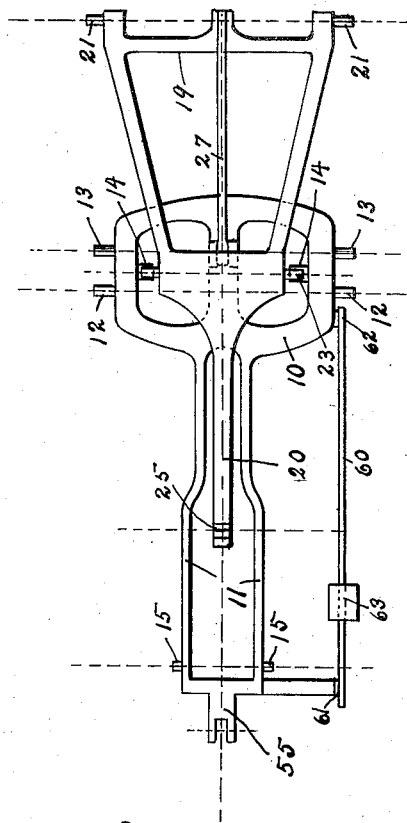
Figure 1:
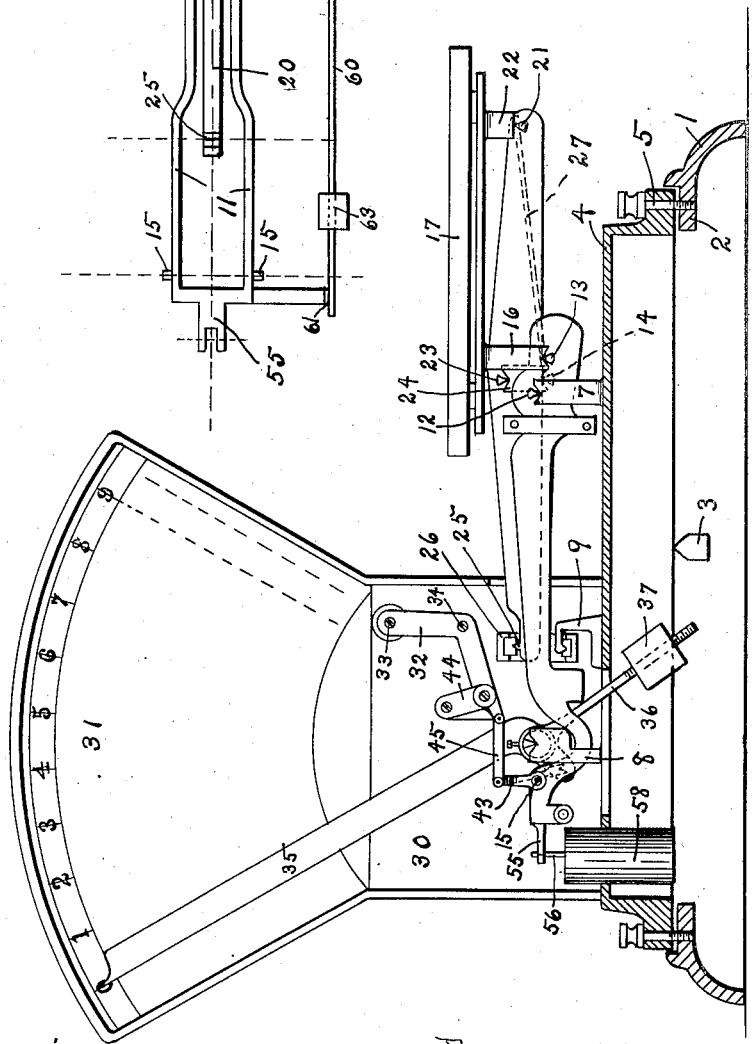

In the accompanying drawings, Figure 1 is a view of the scale and its levers, part of the base being broken away. Fig. 2 is a plan of the levers. Fig. 3 is an elevation, on a larger scale, of the levers and pendulum. Figs. 4 and 5 are diagrams of the levers. Fig. 6 is a view similar to Fig. 3, showing the levers in a different position. Fig. 7 is a cross section on the line 7—7 of Figs. 3 and 6.

Similar reference characters refer to like parts throughout the several views.

In the usual so-called "pendulum" automatic scales, an indicator attached to the pendulum passes over a scale, chart or dial graduated to indicate weights, and the spaces between these graduations vary with their distance from the zero point. The indicator moves equal angular distances with the pendulum, but the leverage of the weight of the pendulum and the parts connected thereto is the cosine of the angle it makes with the horizontal.

In the construction shown in the accompanying drawings, the arcs of movement of the pendulum and the indicator are in proportion to the weights placed on the platform.

The mechanism of the construction shown rests on a sub-base 1 having lugs 2 and knife edges 3. A base 4 rests on these knife-edges, and is held down by the adjusting screws 5 that enter threaded holes in the lugs 2. By these means the top of the base can be held level at all times.

Mounted on the base 4 are the pedestals 7 and 8 and the anchor post 9, which together support the movable mechanism of the scale. The main lever has a front portion 10 and a rearwardly projecting bifurcated arm 11, on which parts are mounted the knife-edge pivots 12, 13, 14 and 15. The pivots 12 rest on the pedestals 7, the pivots 13 support the lugs 16 of the platform 17, the pivots 14 support the second lever, and the pivots 15 connect to the indicating mechanism.

The second lever has a forwardly extending portion 19 which is made open for lightness, and a rearwardly extending arm 20. Pivots 21 at the front of the portion 19 support lugs 22 of the platform; the pivots 23 rest on the connecting thrust-links 24 which in turn rest on the pivots 14 of the main lever; and the pivot 25 at the rear end of the arm 20 engages the under side of the upper bearing block carried by the link 26, the lower bearing block on this link being engaged by the anchor post 9. A link 27 is connected to the main lever on a line with the pivots 13 and with the second, lever on a line with the pivots 21, that is, this link connects to the two levers on the lines of the pivots that support the platform.

The proportions of the distances between pivots 12 and 14, between pivots 21 and 23, and the length of the link 24, to the distances between pivots 12 and 13, between pivots 21 and 25, and the length of the link 26 respectively, should always be constant as shown in Fig. 1. But this rule alone holds good for but limited arcs. For large arcs of movement of the main lever, as when a drum indicator is employed, the distance between the pivots 12 and 14, between the pivots 13 and 14, and between the pivots 14 and 23 should be equal, and one half of the length of the link 26. The distance between the pivots 21 and 23 and between pivots 23 and 25 should be equal. Under such conditions, shown in Figs. 3 and 6, the movements of all the parts will be without binding. The link 27 preserves a perfect relation between the two levers.

Because of the length of the arm 11 and its weight, the pressure on its rear end will normally be down, and the effect of the weight on the platform will be to bring the pendulum to its lowest point, which will occur when the pointer indicates a weight of the full capacity of the chart or dial. This is the exact opposite of the usual pendulum scale where the pendulum is at its lowest point when the scale is unloaded.

Projecting upward from the base 4 is a plate or frame 30, shown in Fig. 1, which supports the chart or dial 31, and to which is secured a brace 32 at the points 33 and 34. This brace is spaced a distance from the frame so the indicator 35 may freely pass behind it. See Fig. 6. The indicator is connected to a pendulum rod 36 which carries a weight 37, both pendulum and indicator being carried by the pivots 38 which rest on the pedestal 8. An arm 39 on the pendulum carries a pivot 40. A thrust-link or pin 41 rests on this pivot 40 and the pointed upper end of this link engages the bearing block 42 carried by the yoke 43. The lower ends of this yoke engage the pivots 15 on the main lever, while its upper end is connected to the adjuster 44 by means of the link 45.

The adjuster is L shaped, its upper end is adjustably pivoted at 47 to the upturned end 48 of the brace 32, while a screw 49 carried by this brace passes through an aperture 50 in the angle of the adjuster. The adjuster may be swung to the right or left, or it may be raised and lowered to vary the path of the upper end of the link 41. These movements all vary the rate of movement of the indicator for constant increases in weights on the platform.

Projecting from the rear end of the main lever is an arm 55, to which is connected the piston rod 56 of the piston 57. The cylinder 58 contains a liquid which does not easily evaporate and which is preferably somewhat viscid. The piston 57 is but slightly less in diameter than the bore of the cylinder. As a result, the rear end of the lever will move up and down slowly without excessive vibration and will soon come to rest. A dash pot connected at this point saves the knife-edge pivots from unnecessary wear. It will be noticed that the piston 57 is shown hollow. In practice it is desirable that the weight of the piston when submerged is just a little more than that of the fluid it displaces, the result being to practically eliminate friction at this point.

The operation of the parts is as follows. When the parts are in the position shown in Figs. 1, 3 and 4, with the indicator at zero, the excess in weight of the rear end of the main lever will not only counter-balance the platform but also the pendulum. Any weight placed on the platform will remove some of the pressure from the pendulum permitting it to swing to the left, until the indicator has reached the maximum of its travel to the right, when the scale will be balanced. This position is shown in Fig. 6, it being understood that the resultant of the weights of both pendulum and indicator is practically under the pivot 38 in the drawing.

Any desirable dial or chart 31 may be secured to the plate 30. If desired, a tare beam 60 may be secured to the main lever at the points 61 and 62, the poise 63 being counter-balanced in any desirable manner when at the right in Fig. 2. Many changes may be made in the details of construction of this mechanism without departing from the spirit of my invention.

Having now explained my improvements, what I claim as my invention and desire to secure by Letters Patent is:—

1. In a scale, the combination of a base, a main scale beam provided with pivots at each end and pivotally mounted on the base intermediate its ends, a second lever having pivots at each end and intermediate its ends, connecting blocks mounted on pivots on the front arm of the main lever upon which blocks the second lever is mounted, a platform resting on pivots carried by the front arms of both levers, a swinging link engaging the rear arm of the second lever to hold it from rising, a link connecting the front arm of both levers to prevent endwise movement between them, a pendulum connected to the rear end of the main lever, and an indicator secured to said pendulum.

2. In a scale, the combination of a base, a vertical plate mounted on the base, a scale leved pivotally mounted on said base intermediate its ends, a pendulum pivotally mounted on said base, a yoke pivotally connected to the rear end of the lever, a pin pivotally engaging the yoke and the pendulum, an adjuster mounted on said plate, and a connector between the adjuster and one end of said yoke.

3. In a scale, the combination of a base, a scale lever mounted thereon intermediate its ends, a weight receiving device mounted on one end of said lever, a pendulum mounted on said base near the opposite end of the lever and provided with an arm having a pivot mounted thereon, a pin mounted on said pivot, a yoke resting on said pin and having downwardly extending arms engaging pivots at the end of said lever, and means to control the movement of said yoke and pin.

4. In a scale, the combination of a base, a scale lever fulcrumed on said base and having arms extending forward and rearward, a weight receiving device mounted on the forward arm, a pendulum pivoted adjacent the rear end of the lever and having a laterally extending arm, a compression member and a tension member connecting the arm on the pendulum to the rear arm of the scale lever to coördinate the movements of the same, and a pointer to indicate the movements.

5. In a scale, the combination of a base, a main lever pivotally mounted thereon intermediate its ends, and having a pivot at its rear end, a pendulum pivotally mounted on said base, connections between the pendulum and said pivot on the rear end of the main lever whereby the lever and pendulum are caused to swing in unison, a second lever, a link connected to said base and engaging a picot at the rear end of the second lever, a platform supported by pivots mounted on the front ends of both levers, and connecting blocks resting on pivots mounted on the front end of the main lever, said second lever having pivots intermediate its ends resting on the connecting blocks.

6. In an automatic scale, the combination of a scale lever, a pendulum, an indicator connected to the pendulum, a connecting link between the lever and pendulum, and a controller for the path of the link.

7. In an automatic scale, the combination of a scale lever, a pendulum, an indicator connected to said pendulum, a link connected to said lever, a pin engaging the link and the pendulum, and means to control the path of the point of engagement between the link and pin.

8. In an automatic scale, the combination of a scale lever, an upwardly extending link pivoted thereto, means to control the path of the upper end of the link, a pendulum, and a thrust member between the link and pendulum.

9. In an automatic scale, the combination of a frame, a scale lever pivotally mounted thereon, an upwardly extending link pivoted thereto, a controlling device for the path of the upper end of the link comprising an adjustable pivot and a connecting link, a pendulum, and a connector between the upwardly extending link and the pendulum.

10. In an automatic scale, the combination of a scale lever, a pendulum, a jointed connector between the lever and pendulum, and a pivoted link to control the path of the joint in said connector.

In testimony whereof I have signed this specification in the presence of two subscribing witnesses.

FREMONT H. BUCKINGHAM.

Witnesses:
OSCAR B. MARX,
LOUIS JAENICHEN.